US012420454B2

United States Patent
Kodaira et al.

(10) Patent No.: US 12,420,454 B2
(45) Date of Patent: Sep. 23, 2025

(54) RESIN RECOVERY METHOD

(71) Applicant: HONDA MOTOR CO., LTD., Tokyo (JP)

(72) Inventors: Ryosuke Kodaira, Saitama (JP); Yoshitaka Suzuki, Saitama (JP); Yoichiro Suzuki, Saitama (JP); Kohei Fukunishi, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 18/827,878

(22) Filed: Sep. 9, 2024

(65) Prior Publication Data

US 2025/0083363 A1    Mar. 13, 2025

(30) Foreign Application Priority Data

Sep. 13, 2023   (JP) .................................. 2023-148756

(51) Int. Cl.
  *B29B 17/04*   (2006.01)
  *B29B 17/02*   (2006.01)

(52) U.S. Cl.
  CPC .......... *B29B 17/0404* (2013.01); *B29B 17/02* (2013.01); *B29B 2017/0234* (2013.01); *B29B 2017/0241* (2013.01); *B29B 2017/0272* (2013.01)

(58) Field of Classification Search
  CPC ................ B29B 17/0404; B29B 17/02; B29B 2017/0234; B29B 2017/0241; B29B 2017/0272
  See application file for complete search history.

(56) References Cited

U.S. PATENT DOCUMENTS

2020/0261952 A1*  8/2020  Murata .................... B09B 3/00

FOREIGN PATENT DOCUMENTS

| JP | 2003236837 A | 8/2003 |
| JP | 2008178846 A | 8/2008 |

* cited by examiner

*Primary Examiner* — Jacob S. Scott
*Assistant Examiner* — Miraj T. Patel
(74) *Attorney, Agent, or Firm* — CKC & PARTNERS CO., LLC

(57) ABSTRACT

A method for recovering resin from a salvage vehicle is provided that includes the steps of: dismantling the salvage vehicle to obtain a salvage vehicle shell; shredding the salvage vehicle shell to obtain a first shredder dust; air sorting the first shredder dust to obtain first low-specific-gravity dust and first high-specific-gravity dust which is higher specific gravity than the first low-specific-gravity dust; and wet gravitational sorting the first high-specific-gravity dust, in which interior components containing fiber are removed upon dismantling the salvage vehicle, and further including steps of shredding the interior components to obtain second shredder dust; and air sorting the second shredder dust to obtain second low-specific-gravity dust and second high-specific-gravity dust which is higher specific gravity than the second low-specific-gravity dust.

5 Claims, 3 Drawing Sheets

RESIN RECOVERY METHOD

This application is based on and claims the benefit of priority from Japanese Patent Application No. 2023-148756, filed on 13 Sep. 2023, the content of which is incorporated herein by reference.

BACKGROUND OF THE INVENTION

Field of the Invention

The present invention relates to a method of recovering resin from salvage vehicles.

Related Art

In recent years, efforts directed at a large-scale reduction in the generation of waste material is becoming active by preventing the generation, reducing, recycling and reusing waste material. Directed to this realization, research and development is being carried out in relation to recovering resins from salvage vehicles.

Patent Document 1 discloses a recycling method for shredder dust of scrapped automobiles which dismantles and shreds a scrapped automobile, sorts out harmful and valuable materials, conducts sorting out in a series of processing steps on the shredder dust obtained, and selectively recovers foamed urethanes and foamed plastics composed mainly of this. Herein, the processing steps include a step of conducting sorting which employs the difference in repulsive force of objects, on the shredder dust, and a step of conducting gravitational sorting processing on objects having relatively low repulsive force. Herein, as a method of specific gravity sorting, an air sorting method is used.

Patent Document 2 discloses a sorting method for shredded industrial waste which recovers valuable materials by sorting shredded industrial waste after removing metals and glass by gravity sorting. The sorting method of shredded industrial waste consists of an air screening step of sorting shredded industrial waste into light substances and heavy substances by sorting by air in a pre-stage of gravity sorting without shredding; and a gravity sorting step of sorting and removing chlorine-containing substances from the light substances or heavy substances by dipping the light and heavy substances sorted in the air sorting step separately in a sorting liquid to subject to gravity sorting. Herein, the shredded industrial waste is debris from which metals have been removed after shredding the scrapped vehicle from which reusable components have been removed.

Patent Document 1: Japanese Unexamined Patent Application, Publication No. 2003-236837
Patent Document 2: Japanese Unexamined Patent Application, Publication No. 2008-178846

SUMMARY OF THE INVENTION

However, with the methods disclosed in Patent Documents 1 and 2, the recovery rate and recovery concentration of olefin resin declines, accompanying the recovered amount of low-specific-gravity dust increasing, due to hard plastics containing olefin resin getting tangled with fibers, upon air sorting. Herein, the low-specific-gravity dust is used mainly in thermal recovery applications.

The present invention has an object of providing a resin recovery method capable of improving the recovery rate and recovery concentration of olefin resin.

According to a first aspect of the present invention, a method for recovering resin from a salvage vehicle includes the steps of: dismantling the salvage vehicle to obtain a salvage vehicle shell; shredding the salvage vehicle shell to obtain a first shredder dust; air sorting the first shredder dust to obtain first low-specific-gravity dust and first high-specific-gravity dust which is higher specific gravity than the first low-specific-gravity dust; and wet gravitational sorting the first high-specific-gravity dust, in which interior components containing fiber are removed upon dismantling the salvage vehicle, and further includes steps of shredding the interior components to obtain second shredder dust; and air sorting the second shredder dust to obtain second low-specific-gravity dust and second high-specific-gravity dust which is higher specific gravity than the second low-specific-gravity dust.

According to a second aspect of the present invention, in the resin recovery method as described in the first aspect, the first high-specific-gravity dust is water gravitational sorted to obtain a dust having specific gravity less than 1, and dust having a specific gravity of at least 1.

According to a third aspect of the present invention, in the resin recovery method as described in the second aspect, the dust having specific gravity less than 1 contains olefin resin.

According to a fourth aspect of the present invention, in the resin recovery method as described in any one of the first to third aspects, iron is recovered by magnetic sorting the shredded salvage vehicle shell, upon obtaining the first shredder dust, and iron is recovered by magnetic sorting the shredded interior components upon obtaining the second shredder dust.

According to a fifth aspect of the present invention, the resin recovery method as described in any one of the first to fourth aspects further includes a step of recovering non-ferrous metal by metal sorting the first high-specific-gravity dust, in which the first high-specific-gravity dust that was metal sorted is wet gravitational sorted.

According to a sixth aspect of the present invention, in the resin recovery method as described in any one of the first to fifth aspects, an airflow upon air sorting the second shredder dust is greater than an airflow upon air sorting the first shredder dust.

According to the present invention, it is possible to provide a resin recovery method capable of improving the recovery rate and recovery concentration of olefin resin.

DETAILED DESCRIPTION OF THE INVENTION

Figure 1:
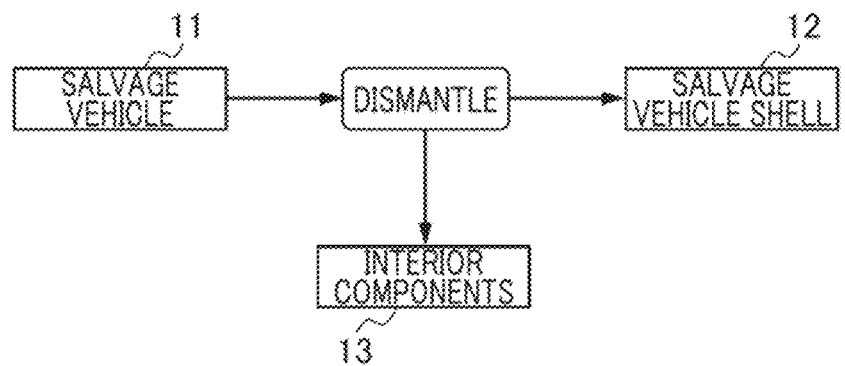
FIG. 1 is a view for explaining a resin recovery method according to an embodiment of the present invention.

Hereinafter, an embodiment of the present invention will be explained while referencing the drawings. More specifically, a resin recovery method according to an embodiment of the present invention will be explained while referencing FIGS. 1 to 3.

The resin recovery method of the present embodiment is a method of recovering resin from a salvage vehicle 11. First, although the salvage vehicle 11 is dismantled to obtain a salvage vehicle shell 12, upon dismantling the salvage vehicle 11, the interior components 13 including fibers are removed (refer to FIG. 1). Herein, the removed interior components 13 are shredded separately from the salvage vehicle shell 12 as described later; therefore, the content of fibers in the shredder dust obtained by shredding the salvage vehicle shell 12 decreases. As a result thereof, upon air sorting the shredder dust, the recovery rate and recovery concentration of olefin resin increases accompanying the recovered amount of low-specific-gravity dust decreasing.

Herein, if shredding the salvage vehicle shell 12 without removing the interior components 13, or shredding the removed interior components 13 together with the salvage vehicle shell 12, upon air screening the shredder dust, the recovery rate or recovery concentration of olefin resin declines accompanying the recovered amount of low-specific-gravity dust in which fibers are entangled increasing.

The interior components 13 are not particularly limited so long as containing fibers; however, for example, carpet, dash insulation, seats, roof lining and trunk flooring can be exemplified. The fibers are not particularly limited; however, for example, non-woven fibers and pulp fibers can be exemplified. The fiber length of the fibers is not particularly limited; however, for example, they are at least 15 mm and no more than 100 mm.

It should be noted that, upon dismantling the salvage vehicle 11, for example, motors, powertrain, suspension components, audio components, radiators, wiring harnesses and the like are removed. In addition, prior to dismantling the salvage vehicle 11, for example, the refrigerant gas of the air conditioner, airbags, engine oil, transmission oil, coolant, brake fluid, power steering fluid, fuel, and batteries are recovered.

In the salvage vehicle shell 12, for example, iron and non-ferrous metals (copper, aluminum, etc.), resins (olefin resin, rubber, etc.), and glass are included; therefore, the resins are recovered from the salvage vehicle shell 12 as follows (refer to FIG. 2).

First, after shredding the salvage vehicle shell 12, the shredded salvage vehicle shell 12 is magnetically sorted to recover iron 21, and a first shredder dust 22 is obtained. Herein, upon magnetically sorting the shredded salvage vehicle shell 12, a known magnetic sorting machine is used. Next, the first shredder dust 22 is air sorted to obtain the first low-specific-gravity dust 23 and a first high-specific-gravity dust 24, which is higher specific gravity than the first low-specific-gravity dust 23. Herein, upon air sorting the first shredder dust 22, a known air sorting machine is used. Next, after metal sorting the first high-specific-gravity dust 24 to recover non-ferrous metals 25, the metal sorted first high-specific-gravity dust 24 is water gravitational sorted to obtain less than 1 specific gravity dust 26 and higher than 1 specific gravity dust 27. Herein, upon metal sorting the first high-specific-gravity dust 24, a known metal sorting machine is used. In addition, upon water gravitational sorting the metal sorted first high-specific-gravity dust 24, a known wet gravity sorting machine with water as the sorting medium is used.

The less than 1 specific gravity dust 26 contains olefin resin; however, the content of olefin resin in the less than 1 specific gravity dust 26 is preferably at least 95% by mass, and is more preferably at least 98% by mass. If the content of olefin resin in the less than 1 specific gravity dust 26 is at least 95% by mass, it is possible to chemically recycle without sorting the less than 1 specific gravity dust 26.

The higher than 1 specific gravity dust 27 contains rubber.

It should be noted that the step of recovering the iron 21, or the step of recovering non-ferrous metals 25 may be omitted, as necessary. In addition, a sorting medium other than water may be used to wet gravitational sort the metal sorted first high-specific-gravity dust 24, as necessary.

On the other hand, since iron, resins (plastic, fibers, etc.) are contained in the interior components 13, for example, resins are recovered from the interior components 13 in the following way (refer to FIG. 3).

First, after shredding the interior components 13, the shredded interior components 13 are magnetically sorted to recover the iron 31, and the second shredder dust 32 is obtained. Herein, upon recovering the iron 31, a known magnetic sorting machine is used. Next, the second shredder dust 32 is air sorted to obtain the second low-specific-gravity dust 33 and the second high-specific-gravity dust 34 having higher specific gravity than the second low-specific-gravity dust 33. Herein, upon air sorting the second shredder dust 32, a known air sorting machine is used. The resins contained in the second low-specific-gravity dust 33 are depolymerized as necessary.

The airflow upon air sorting the second shredder dust 32 is preferably greater than the airflow upon air sorting the first shredder dust 22. The recovery rate of resin contained in the second low-specific-gravity dust 33 thereby improves accompanying the recovered amount of second low-specific-gravity dust 33 increasing.

It should be noted that the step of recovering the iron 31 may be omitted as necessary.

Although an embodiment of the present invention has been explained above, the present invention is not to be limited to the above embodiment, and the above embodiment may be modified as appropriate within the scope of the gist of the present invention.

EXAMPLES

Hereinafter, examples of the present invention will be explained; however, the present invention is not to be limited to the examples.

Example 1

Figure 2:
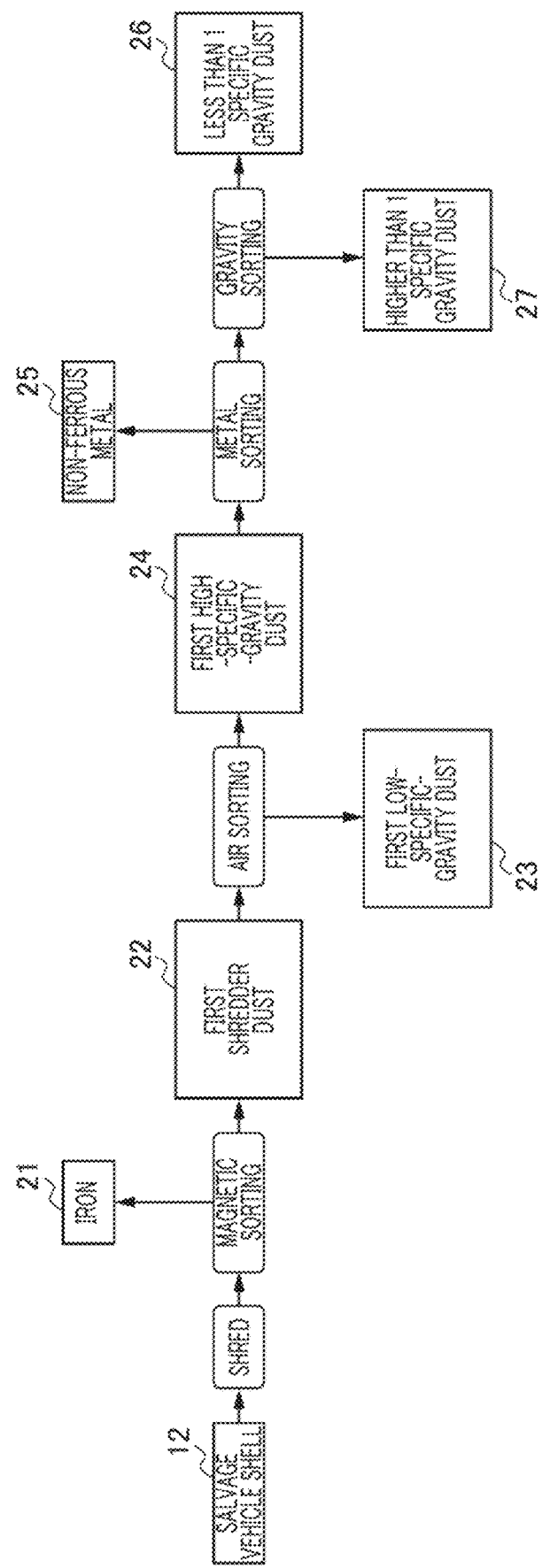
FIG. 2 is a view for explaining a resin recovery method according to an embodiment of the present invention.
Figure 3:
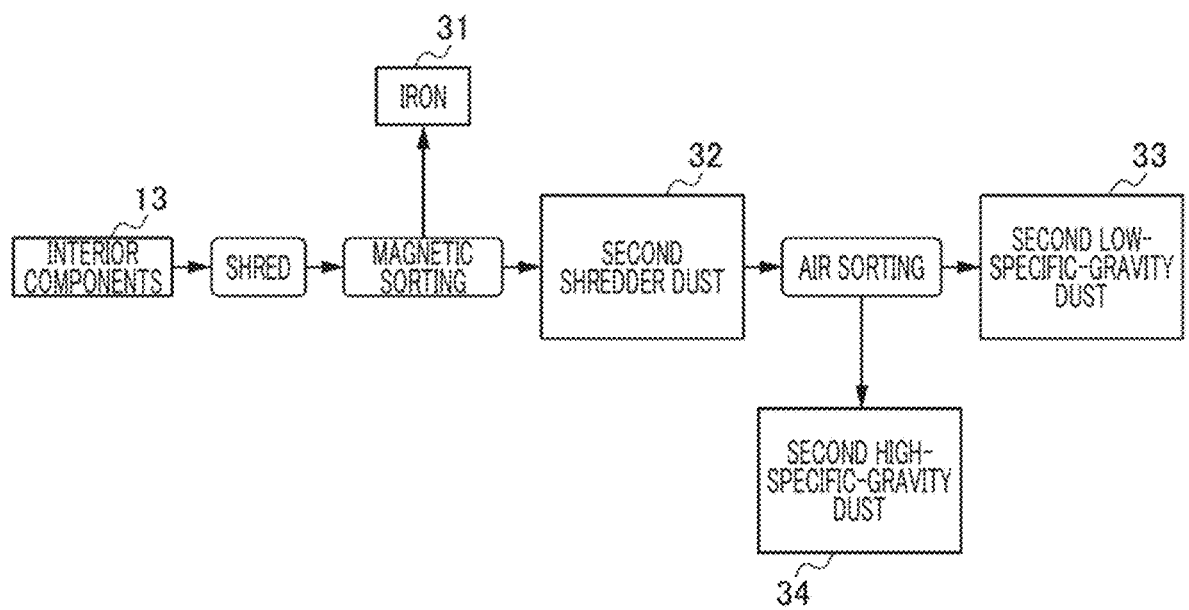
FIG. 3 is a view for explaining a resin recovery method according to an embodiment of the present invention.

According to the resin recovery method shown in FIGS. 1 to 3, resins were recovered from one salvage vehicle. At this time, upon dismantling the salvage vehicle, carpets, dash insulation, seats, roof lining and trunk flooring were removed as the interior components containing fibers. Upon dismantling the salvage vehicle, motors, powertrain, suspension components, audio components, radiators and wiring harnesses were also removed. Prior to dismantling the salvage vehicle, the refrigerant gas of the air conditioner, airbags, engine oil, transmission oil, coolant, brake fluid, power steering fluid, fuel, and batteries were recovered. The set value for airflow upon air sorting the first shredder dust and air sorting the second shredder dust were set to 170A and 220A, respectively. As a result thereof, the recovered amounts of the first low-specific-gravity dust, less than 1 specific gravity dust, higher than 1 specific gravity dust, and second low-specific-gravity dust were 17 kg, 26 kg, 50 kg and 34 kg, respectively.

Comparative Example 1

Other than shredding the removed interior components together with the salvage vehicle shell, the resins were recovered from one salvage vehicle similarly to Example 1. As a result thereof, the recovered amounts of (first) low-specific-gravity dust, less than 1 specific gravity dust, and higher than 1 specific gravity dust were 140 kg, 5 kg and 5 kg, respectively.

Based on the above, upon dismantling the salvage vehicle, by removing interior components containing fibers, and shredding separately from the salvage vehicle shell, it was found that the recovered amounts of the less than 1 specific gravity dust, and higher than 1 specific gravity dust increased accompanying the recovered amount of first high-specific-gravity dust decreasing, upon air sorting the first shredder dust.

(Recovered Concentration of Olefin Resin)

In the following way, the content of olefin resin in the less than 1 specific gravity dust was measured to define the recovered concentration of olefin resin. First, the content of organic component in the less than 1 specific gravity dust was obtained by elemental analysis (CHN analysis) and combustion ion chromatography (IC). Next, the content of olefin resin in the organic component was quantitatively analyzed by NMR.

(Recovery Rate of Olefin Resin)

Based on the recovered amount of less than 1 specific gravity dust, recovery concentration of olefin resin and the usage amount of olefin resin used in the vehicle, the recovery rate of olefin resin was calculated.

Figure 4:
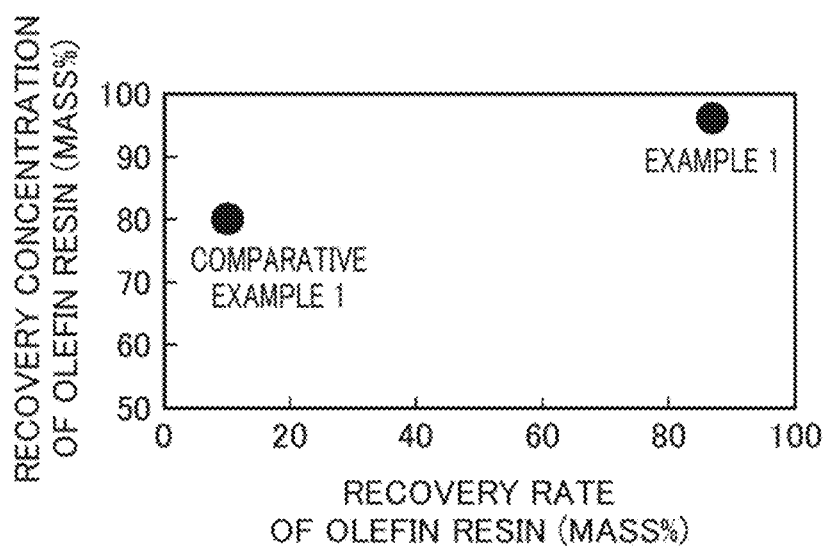
FIG. 4 is a graph showing the relationship of recovery concentration of olefin resin relative to recovery rate of olefin resin for Example 1 and Comparative Example 1.

FIG. 4 shows the relationship of the recovery concentration of olefin resin relative to the recovery rate of olefin resin for Example 1 and Comparative Example 1.

From FIG. 4, it is found that Example 1 had higher recovery rate and recovery concentration of olefin resin than Comparative Example 1.

EXPLANATION OF REFERENCE NUMERALS 11 salvage vehicle
12 salvage vehicle shell
13 interior components
21, 31 iron
22 first shredder dust
23 first low-specific-gravity dust
24 first high-specific-gravity dust
25 non-ferrous metal
26 less than 1 specific gravity dust
27 higher than 1 specific gravity
32 second shredder dust
33 second low-specific-gravity dust
34 second high-specific-gravity dust

What is claimed is:

1. A method for recovering a resin from a salvage vehicle, the method comprising the steps of:
    dismantling the salvage vehicle to obtain a salvage vehicle shell;
    shredding the salvage vehicle shell to obtain a first shredder dust;
    air sorting the first shredder dust to obtain a first low-specific-gravity dust and a first high-specific-gravity dust which has a higher specific gravity than the first low-specific-gravity dust; and
    wet gravitational sorting the first high-specific-gravity dust,
    wherein interior components containing fiber are removed upon dismantling the salvage vehicle,
    the method further comprising steps of: shredding the interior components to obtain a second shredder dust; and
    air sorting the second shredder dust to obtain a second low-specific-gravity dust and a second high-specific-gravity dust which has a higher specific gravity than the second low-specific-gravity dust,
    wherein an airflow upon the air sorting of the second shredder dust is greater than an airflow upon the air sorting of the first shredder dust.

2. The method for recovering a resin according to claim 1, wherein the first high-specific-gravity dust is water gravitational sorted to obtain a dust having a specific gravity of less than 1, and a dust having a specific gravity of at least 1.

3. The method for recovering a resin according to claim 2, wherein the dust having the specific gravity of less than 1 contains olefin resin.

4. The method for recovering a resin according to claim 1, wherein iron is recovered by magnetic sorting of the shredded salvage vehicle shell upon obtaining the first shredder dust, and
    iron is recovered by magnetic sorting of the shredded interior components upon obtaining the second shredder dust.

5. The method for recovering a resin according to claim 1, further comprising before the wet gravitational sorting, a step of recovering a non-ferrous metal by metal sorting the first high-specific-gravity dust,
    wherein the first high-specific-gravity dust that was metal sorted is wet gravitational sorted.

* * * * *